Figure 1:
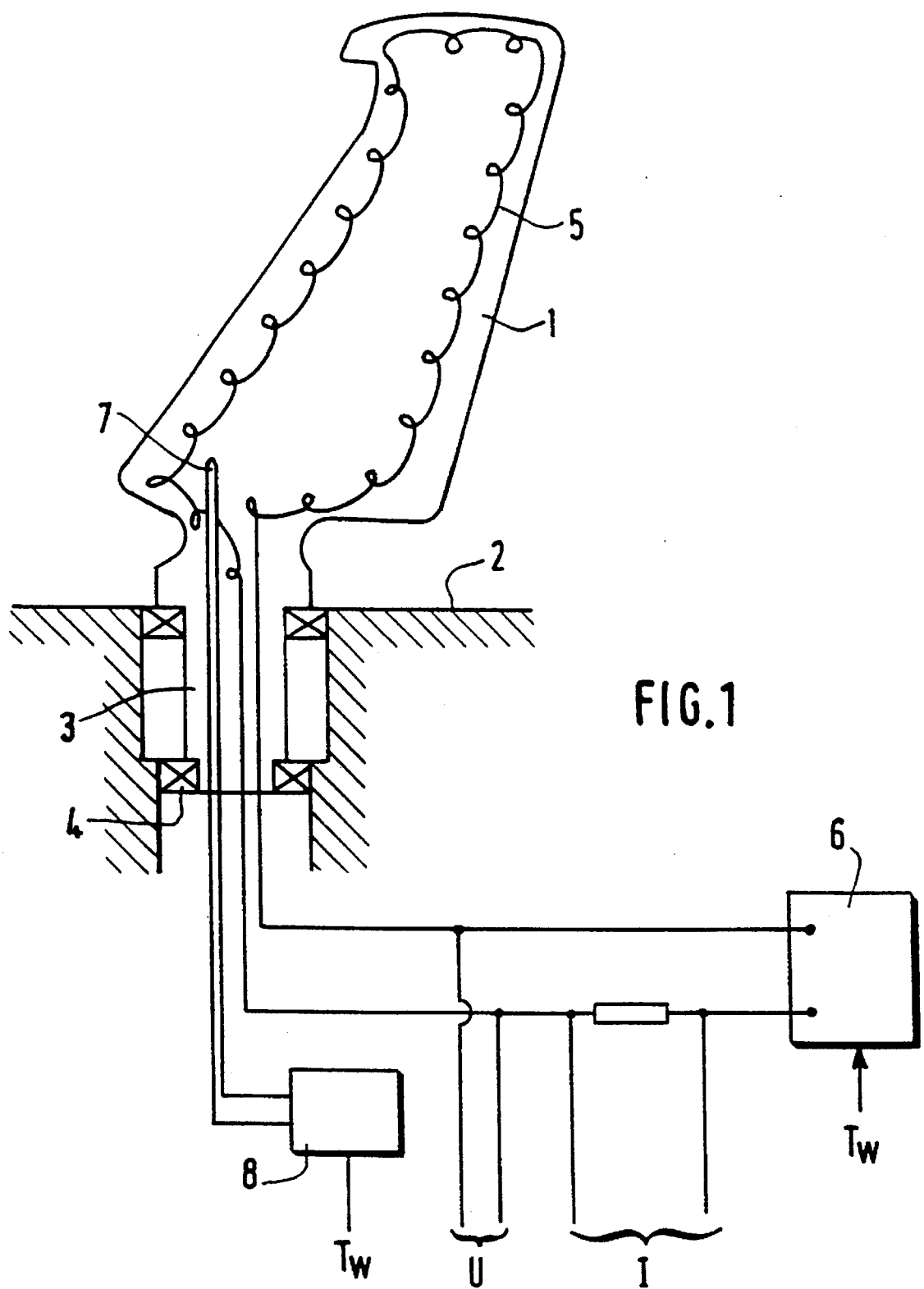

United States Patent
LeBlond et al.

[11] Patent Number: 5,575,440
[45] Date of Patent: Nov. 19, 1996

[54] PROCEDURE AND DEVICES TO DETERMINE THE SEVERITY OF ICING CONDITIONS FOR AN AIRCRAFT

[75] Inventors: Henri LeBlond, Versailles; Joel Choisnet, La Frette S/Seine; Gregoire Dodel, Neuilly Sur Seine, all of France

[73] Assignee: Sextant Avionique, Meudon la Foret, France

[21] Appl. No.: 348,086

[22] Filed: Nov. 25, 1994

[30] Foreign Application Priority Data

Nov. 25, 1993 [FR] France ................... 93 14092

[51] Int. Cl.$^6$ .................................. B64D 15/00
[52] U.S. Cl. ................. 244/134 F; 244/134 D; 244/134 E; 244/134 R
[58] Field of Search ............ 244/134 R, 134 D, 244/134 E, 134 F; 340/581, 962; 219/497, 490

[56] References Cited

U.S. PATENT DOCUMENTS

| | | | |
|---|---|---|---|
| 3,276,254 | 10/1966 | Richard | 244/134 F |
| 3,305,851 | 2/1967 | Brandtszteter . | |
| 3,350,541 | 10/1967 | Richardson | 244/134 F |
| 4,320,782 | 3/1982 | Frederick . | |
| 4,333,004 | 6/1982 | Forgue et al. . | |
| 5,003,295 | 3/1991 | Kleven | 244/134 F |
| 5,043,558 | 8/1991 | Byles | 244/134 D |
| 5,296,853 | 3/1994 | Federow et al. | 244/134 F |

FOREIGN PATENT DOCUMENTS

| | | |
|---|---|---|
| 1592508 | 6/1970 | France . |
| 0176405 | 4/1986 | France . |
| 0469991A1 | 2/1992 | France . |
| 880530 | 10/1961 | United Kingdom . |
| WO91/04646 | 4/1991 | WIPO . |
| WO91/04646A1 | 4/1991 | WIPO . |

*Primary Examiner*—Galen L. Barefoot
*Assistant Examiner*—Tien Dinh
*Attorney, Agent, or Firm*—Lowe, Price, LeBlanc & Becker

[57] ABSTRACT

A method and apparatus for determining the severity of icing conditions for an aircraft in flight. A mobile probe projecting from a surface of the aircraft is heated to a predetermined range of temperatures, and the total power required for the heating is measured. The measured total power is divided into a basic power corresponding to the thermal exchange in dry air having the same flow parameters as those measured and a complimentary power corresponding to the evaporating of drops of water contained in the actual air. A parameter representative of the speed at which the thickness of ice increases at the surface of the aircraft is computed from the complementary power.

11 Claims, 2 Drawing Sheets

PROCEDURE AND DEVICES TO DETERMINE THE SEVERITY OF ICING CONDITIONS FOR AN AIRCRAFT

The present invention concerns a procedure and a device to determine the severity of icing conditions for an aircraft.

It is important that the pilot of an aircraft knows the icing conditions so that he can avoid zones at risk or trigger anti-icing devices. In effect, the ice which accumulates particularly on the leading edge of wings or tail units or motor air inlets, makes the apparatus heavy impairing its performances, brings about losses in lift which could lead to stalling as well as choking the motor.

The phenomenon of icing is encountered when travelling through clouds when certain particular conditions are met.

Firstly, nothing occurs when travelling through a cloud of ice. Icing can only occur when travelling through a cloud formed from drops of liquid water. Moreover, the static temperature must be negative; then the liquid is therefore in a supercooled state. Finally, the concentration of supercooled liquid water must be sufficient and the temperature of the aircraft wall must also be negative.

Currently known devices to detect the severity of the risk of icing are generally based on measuring the accretion speed of the frost.

In a first type of device, the ice is left to accumulate on a bar which is projected from the apparatus and therefore vibration, are maintained. The frequency of these vibrations is a function of the thickness the ice covering the bar and reduces at the same rate as this thickness. When the frequency of the vibration reaches a certain threshold, the bar is reheated which obviously brings about the melting of the ice and therefore an increase in the frequency. When this reaches its nominal value, the heating is interrupted which brings about a new accretion of the ice and therefore a new reduction in the vibration frequency. The duration of such a cycle that is to say the duration separating the two instances of implementing the heating, characterises consequently the accretion speed of the ice and therefore the severity of the icing conditions.

In another type of device, holes are formed on the surface of a part projecting from the apparatus and which are connected to a pressure switch; a heating system is designed as in the previous case. The ice accretion phenomenon brings about progressive blocking of the hole and consequently a reduction in the pressure recorded by the pressure switch. When is pressure reaches a lower threshold, the device is heated to avoid ice and the heating is interrupted when the pressure reaches the upper threshold again. As previously, the interval of time separating the two instance of implementing the heating characterises the accretion time and therefore the severity of the frosting conditions.

These devices present a certain number inconveniences.

Firstly, their response time is very long, of the order of a minute. It is in fact necessary to wait at least two heating cycles to know the duration which separates them. Also, no information is available during the heating.

Moreover, they do not operate by definition if the temperature is positive since then there is no ice accretion. The icing conditions can be severe even when the temperature is positive since it can negative at another site of the aircraft (for example in an air inlet because of expansion).

The present invention aims to bridge the inconveniences.

To this end, the invention firstly has as its aim a procedure to determine the severity of the icing conditions for an aircraft in flight, characterised by the fact that a part is heated which projects beyond the surface of the said aircraft, that the total power necessary to maintain the said temperature is measured and that the said total power is divided into a basic power corresponding to the thermal exchanges in dry air having the same flow parameters as those measured and a complementary power corresponding to the evaporating of drops of water contained in the actual air.

Heating can consist of maintaining the temperature constant. However, preferably the temperature is kept in a range for example between 20° C. and 70° C.

It will in fact be seen hereinbelow that he difference between the total applied power and the power corresponding to convective thermal exchanges with the ambient air, that is to say the power which would be dissipated by the projecting part if it was placed in a flow of air which is not loaded with drops of water, is proportional to the product of the concentration of air in the liquid water by the speed of the flow. This product is equal to the accretion speed of the icing in the event of the temperature being negative.

This procedure to determine the severity of the icing conditions thus presents the first advantage of being instantaneous. Moreover it can be used even when the local temperature at the level of the probe is positive. In this case, it consequently represents the severity of the risk of icing at another site on the aircraft where the temperature would be negative.

In a particular mode of realising the invention, the flow parameters in the proximity of the said part, especially the total temperature, the static pressure and the total pressure are measured in order to determine the power which corresponds to the convective thermal exchanges with the ambient air.

The invention also has as its aim a device to determine the severity of the icing conditions for an aircraft in flight by fact that it comprises a part which projects beyond the surface of the said aircraft, means to maintain the said part at a predetermined temperature, means to measure the total power necessary to maintain the temperature, and calculation means adapted to calculate the said severity according to the said total power and the flow parameters in the proximity of the said part.

The said part can be in particular a blade with a multifunction probe to measure the aerodynamic parameters of the flight of the aircraft, and more particularly a mobile blade which can be aligned in the wind's eye.

In a particular mode of realising the invention, this device comprises means to determine the temperature of the projecting part, in particular calculation means to calculate the temperature based on electric parameters in the heating means.

The invention also has as its aim a multi-function probe to measure the aerodynamic parameters of the flight of an aircraft comprising heating means in view of its de-icing, characterised by the fact that it comprises means to measure the power of the applied heating, and calculation means fitted to determine the severity of the icing conditions using the said power and the said aerodynamic parameters.

This probe is particularly interesting since it does not require the projection of any additional part on the surface of the aircraft and that all its parts outside the aircraft are unchanged by the relation with the existing probes, the only added elements being the means to measure the power and the calculation means. Moreover, the latter are generally already in existence and only their software has to be adapted to calculate the severity of icing conditions.

In a particular mode of realising the intention, a probe according to the invention comprises means to determine the temperature of the projecting part, and more particularly, calculation means to calculate the temperature based on the electric parameters in the heating means.

Figure 2:
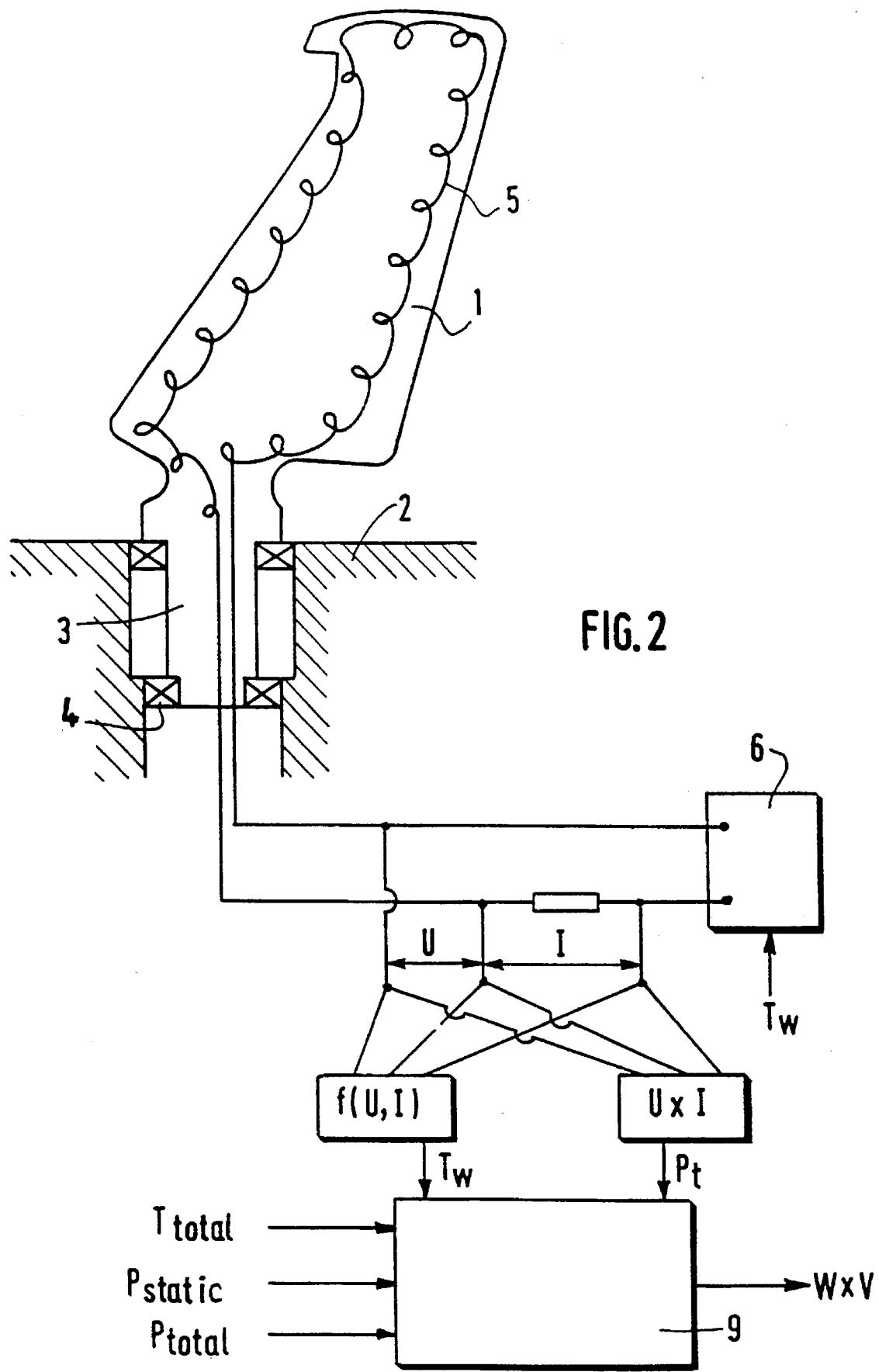

Now, two particular methods of realising the invention will be described as a non-restrictive example, by referring to the schematic drawings attached in which:

FIG. 1 represents a probe according to a first method of realising the invention, and, FIG. 2 is a view similar to view 1 of a probe according to a second method of realisation.

The probe in FIG. 1 comprises, in a manner known through documents EP-A-O 176 405 and EP-A-O 469 991, an assembled mobile blade 1 which rotates on the structure 2 of an aircraft. To this end, the shaft 3 solid with the blade is mounted on ball bearings 4 fixed to the structure 2.

The blade 1 comprises an electric heating resistor 5 supplied by an electric generator 6. A thermocouple 7 connected to its treatment electronics 8 supplies temperature $T_W$ for blade 1. Temperature $T_W$ is itself supplied to the generator 6 so that it can regulate this temperature in the proximity of a prescribed temperature, typically between 20° C. and 70° C. for example approximately 40° C. This temperature is sufficient for the blade 1 to be in the said dry anti-icing condition, that is to say, such that the possibly supercooled water which has come into contact with blade 1 has evaporated prior to being eliminated over the distance it covers on the blade.

Also, the efficient voltage U is measured at the terminals of resistor 5 and the efficient current I in this resistor in order to deduce the total power $P_t$ expended in blade 1. Here an abstraction is made of the thermal losses by convection which could occur on shaft 3 of the blade, this being insulated thermically by appropriate means.

FIG. 2 shows how it is possible to dispense with the thermocouple 7 and its treatment electronics 8 in order to avoid connected electric links in the blade and turning axis.

To this end, the heating wire 5 is made from a material with a strong positive resistivity coefficient. This is generally the case in de-icing resistors in order to benefit from the automatic regulation effect of the re-heating. Here, a local temperature is not measured but the average temperature. The other elements in FIG. 1 are found in FIG. 2.

In this case, value R of resistor 5 can be shown:

$$R = R_o(1 + \alpha T_w)$$

where $R_o$ is a constant equal to a resistor value at 0° C. and $\alpha$ is the thermal resistivity coefficient, typically of the order of 0.004° C.$^{-1}$.

The average temperature $T_W$ of the blade can therefore be deduced from the measurement of U and I and from whom the value of R and therefore $T_W$ is deduced.

Accuracy can therefore be obtained of the order of 1° C. which corresponds to the accuracy desired to detect the severity of the icing conditions.

In the two cases described above, the probe supplies the static pressure and the total pressure of the flow. These parameters, as well as the total flow temperature, the temperature $T_W$ of the blade and the total power $P_t$ developed as shown above, are supplied to the calculator 9 (not show in FIG. 1). Now it will be seen how the calculator 9 deduces the severity of the icing conditions.

The thermal exchanges between blade 1 and the atmospheric air flow which surrounds it can be expressed in the form of two terms when the blade 1 is in a dry anti-icing condition:

$$P_t = P_w + P_a \quad (1)$$

where $P_t$ is the total extended power as has been shown above;

$P_a$ corresponds to the convective thermal exchanges with the ambient air and is therefore the thermal power which would be expended by blade 1 in a flow of air which is not loaded with drops of water;

$P_w$ is the complementary extended thermal power connected to the impact of drops of water on blade 1.

It can be shown that $P_a$ and $P_w$ can be expressed in the following manner when blade 1 is in a flow of air with a speed within the range of usual aeronautical speeds and that the blade is heated to a positive temperature of several dozen degrees.

Firstly it can be written:

$$P_a = K \cdot (T_w - T_t) \cdot N_u \quad (2)$$

where:

K is a constant connected to the form and surface of blade 1

$T_w$ is the temperature on the surface of the blade as described hereinabove, $T_t$ is the adiabatic or total temperature of the air $N_u$ is the Nusselt number for the flow.

Knowledge of the flow parameters (air speed, static temperature, static pressure) allows therefore the power $P_a$, which is necessary to maintain the prescribed temperature on the blade surface, to be calculated when the ambient air is at a total given temperature $T_t$ itself linked to the static temperature and air speed.

Moreover, the impact of the drops of water on the blade generates an additional thermal exchange. These drops evaporate in effect very quickly by absorbing energy $P_w$ such that:

$$P_w = K_1 \cdot w \cdot V[L + C(T_w - T_s)] \quad (3)$$

where:

$K_1$ is a constant linked to the form of the blade,

W is the concentration of liquid water in the air,

V is the speed of the air flow,

L is the latent heat of water vaporisation,

C is the specific heat of the liquid water, $T_w$ is the temperature of the blade as has been seen previously, $T_s$ is the static temperature of the air which corresponds to the temperature of the drops of water which have come in contact with the blade.

It has been shown above that the severity of the icing conditions is defined as the product w×V representative of the speed at which the thickness of the ice increases on the surface of the aircraft.

The formulae above allow the following:

$$w \times V = \frac{(Pt - Pa)}{K_1 [L + C(T_W - T_S)]} \quad (4)$$

where:

Pt is measured,

Pa is calculated based on the conditions of flight by formula (2), $T_w$ is the re-heating temperature of the blade, $T_s$ is the static temperature of the ambient air calculated based on the total temperature measured on the aircraft.

Consequently, the invention allows the severity of icing conditions to be determined permanently using usual aerodynamic parameters and without hypotheses being made on the ambient temperature.

We claim:

1. A method for determining the severity of icing conditions for an aircraft flying in air containing drops of water, comprising the steps of:

heating a part projecting from a surface of said aircraft;

measuring the total power required for said heating;

measuring flow parameters in a proximity of said part;

computing the heating power that would be required in dry air having said flow parameters;

deducting said heating power from said total power to obtain the complementary power required for evaporating said drops of water; and computing from said complementary power a parameter representative of a speed at which the thickness of ice increases at the surface of the aircraft.

2. The method of claim 1, wherein the measured flow parameters include total temperature, static pressure, and total pressure.

3. A device for determining the severity of icing conditions for an aircraft flying in air containing drops of water, comprising:

heating means for heating a part projecting from a surface of said aircraft;

means for measuring the total power required for heating said part;

means for measuring flow parameters around said part;

means for computing the heating power that would be required in dry air having said flow parameters;

means for deducting said heating power from said total power to obtain the complementary power required for evaporating said drops of water; and means for computing from said complementary power a parameter representative of the speed a which the thickness of ice increases at the surface of the aircraft.

4. The device of claim 3, wherein said part projecting from said aircraft comprises:

a blade of a multi-functional probe to measure the flow parameters.

5. The device of claim 4, wherein said blade is mobile for alignment in the wind's eye.

6. The device of claim 4, further comprising:

means for determining the temperature of said blade.

7. The device of claim 6, wherein said means for determining the temperature of said blade comprises:

calculation means for calculating the temperature based on electrical parameters in the heating means.

8. A system for measuring the severity of icing conditions of an aircraft flying in air containing drops of water, comprising:

a multi-functional probe for measuring flow parameters;

heating means for heating said probe to a predetermined range of temperatures;

means for measuring the total power required for heating said probe;

calculating means for calculating the heating power corresponding to the thermal exchanges in dry air having the same flow parameters as those measured; and means for deducing the severity of icing conditions from the measured total power and the calculated heating power.

9. A system according to claim 8, further comprising:

means for determining the temperature of said probe.

10. A system according to claim 9, wherein said means for determining the temperature of said probe comprises:

calculation means for calculating the temperature based on the electric parameters in said heating means.

11. A system according to claim 8, further comprising:

feedback means for heating said probe to a constant temperature within said range of temperatures.

* * * * *